Patented Apr. 14, 1942

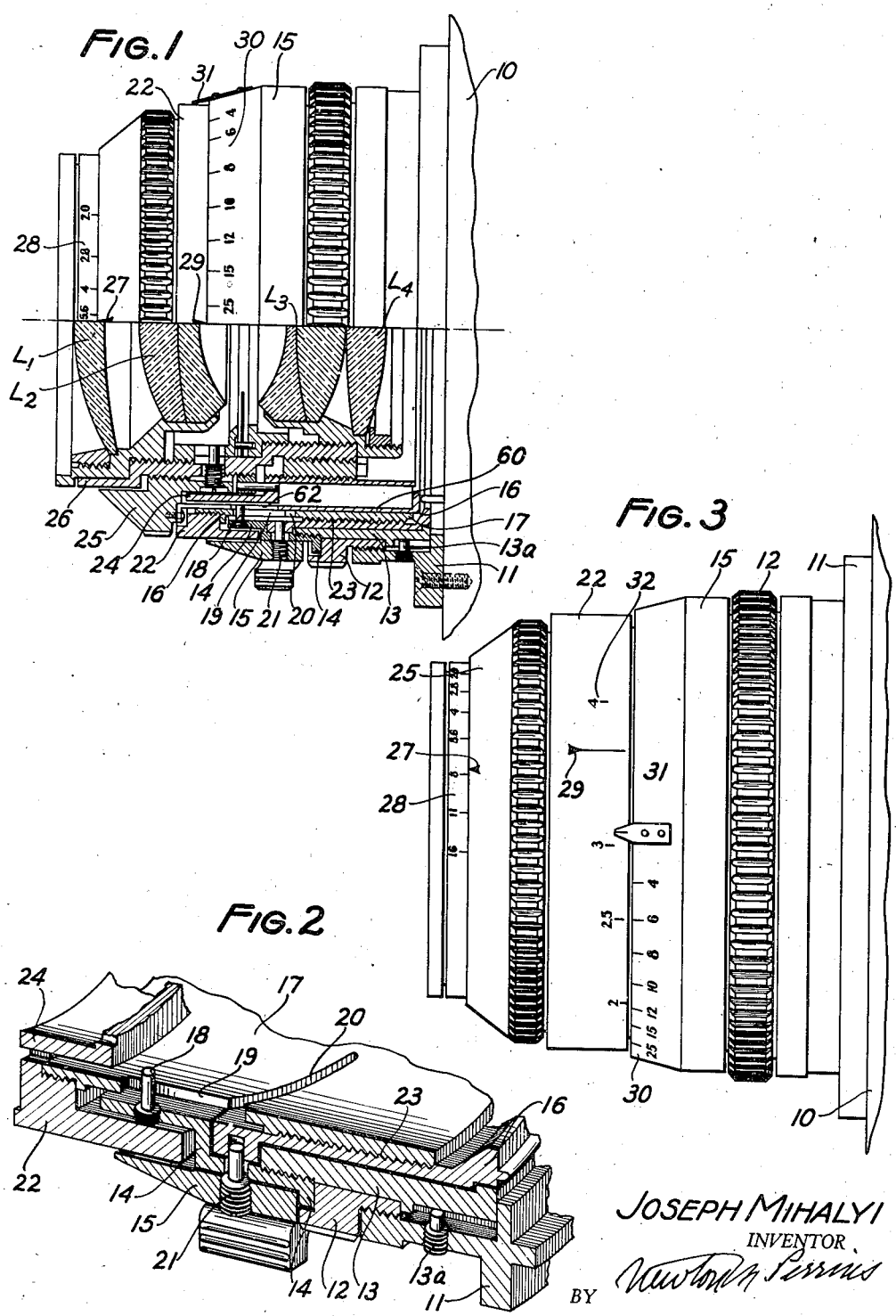

2,279,476

UNITED STATES PATENT OFFICE 2,279,476

LENS MOUNT

Joseph Mihalyi, Rochester, N. Y., assignor to Eastman Kodak Company, Rochester, N. Y., a corporation of New Jersey Application December 2, 1939, Serial No. 307,305

6 Claims. (Cl. 95—45)

This invention relates to camera lenses and particularly to focusing mechanisms for such lenses.

It is an object of the invention to provide a lens having a focusing range greater than normal and particularly to provide such a lens without any loss of accuracy or ease of adjustment over the normal range.

Camera lenses may be focused either by moving one lens component relative to the rest of the lens or by adjusting the lens axially as a whole. Since the present invention is most useful with the latter type of focusing, only such a system will be described in detail.

It is an object of the preferred embodiment of the invention to provide a close-up focusing range for a lens system having a screw type focusing arrangement.

According to the invention, a lens is provided with a mount having a normal focusing mechanism and an auxiliary focusing mechanism operating over a close-up range whose far point is substantially the same as the near point of the normal range. Thus the two mechanisms are substantially complementary in covering the total focusing range of the system. There is also provided according to the invention a system of mechanical stops and guides for preventing the simultaneous operation of both focusing mechanisms.

In one embodiment of the invention, the mechanism for focusing over the normal range consists of a standard screw driven mount wherein the lens mount is restrained to move only axially and not rotationally with respect to the camera and the driving member screw threadedly engaging the mount is permitted rotational movement only. For accuracy, elimination of backlash and ease of operation, such standard arrangements in general permit only a limited rotary movement of the driving member, the whole of this available motion being used up in covering the normal range. Further rotational movement of the driving member beyond the limit of this range is prevented by a stop. To obtain close-up focusing, the driving member is rotated to its near point limit, then the restraining member which prevents rotational movement of the mount is rendered ineffective and is replaced by a restraining member to prevent any motion of the former driving member. The driving member is thus rigid with respect to the camera when operating over the close-up range. This close-up focusing is obtained by rotating the mount with respect to the now rigid driving member, i. e. by simply unscrewing the mount from the driving member.

The invention will be more fully explained by the following description of one embodiment thereof when read in connection with the accompanying drawing, in which:

Fig. 1 shows partly in cross section, a lens mount according to the invention.

Fig. 2 is a perspective sectional detail of the pertinent part of Fig. 1.

Fig. 3 shows the appearance of the lens mount of Fig. 1 when focused in the close-up range.

In Fig. 1 the front wall 10 of a camera carries an objective in a focusing mount which is attached to the camera by a rigid adapter ring 11. The embodiment shown here is an application of the invention to the lens mount described in my copending application Serial Number 219,178, filed July 14, 1938, now U. S. Patent 2,186,616, dated January 9, 1940. Since the lens mount is completely described in that copending application except for the parts made necessary by the present invention, I will now describe in detail only the parts of the mount which are necessary for this present invention. A brief outline of the whole lens system will also be given for completeness.

The lens in its mount is placed in the rigid adapter ring 11 and is attached thereto by a locking nut 12. The lens mount itself consists of a stationary sleeve 13 held against rotary motion by a stud 13a in the adapter ring 11 which stud 13a engages an open end slot in the sleeve 13. A stationary ring 14 is secured by screw threads to, and forms part of the stationary sleeve 13. The objective is made up of lens components L1, L2, L3, and L4 each carried by a mount screwed into a lens barrel 26. This lens barrel 26 together with the diaphragm setting ring 25, the diaphragm index 27 and diaphragm scale 28 is all supported by an offset carrying sleeve 24. As far as the present invention is concerned, the objective as a whole may be considered as being carried directly and rigidly by this carrying sleeve 24. To focus the lens, it is necessary to move this carrying sleeve 24 (i. e. the whole objective) axially with respect to the stationary sleeves 13 and 14.

For this purpose, there is provided a driving member or driving sleeve 16 which may be rotated by a focusing ring 15 which is attached by a stud 21 extending through a peripheral slot in the stationary sleeve 14 to the driving sleeve 16. By means of screw threads 23, this driving sleeve 16 engages a focusing sleeve 17 which is rigidly attached to a cover ring 22 and to the lens carrying sleeve 24. Throughout the normal focusing range of the camera this focusing sleeve 17 is prevented against rotational movement by a stationary stud 18 carried by the stationary ring 14 which engages an axial or longitudinal slot 19 in the sleeve 17. An additional floating sleeve 60 having a slot 62 is shown in Fig. 1, but pertains only to the invention described in my copending application mentioned above. It is shown here so that anyone comparing the two specifications will not confuse slot 62 with the longitudinal slot 19 or with the spiral extension 20 thereof which does not appear in the copending case.

According to the invention, the slot 19 is arranged to have a spiral portion 20, best shown in Fig. 2, extending from one end thereof. When the lens is focused for its normal near point, the stud 21 in the focusing ring 15 comes against the end of the slot in the stationary sleeve 14 and further rotational movement of the driving sleeve 16 is thus prevented. At the same time, the stationary stud 18 comes to the inner end of the longitudinal slot 19 and is free to move into the spiral slot 20. This spiral slot 20 is arranged to match the screw threads 23 exactly, so that the whole lens mount including the carrying sleeve 24 and the cover ring 22 may be unscrewed from the driving sleeve 16.

Attention is drawn to the fact that the motion of the driving sleeve 16 and focusing ring 15 to focus the lens from infinity to its normal near point is opposite to the direction of rotation of the focusing sleeve 17 as it is unscrewed from the driving sleeve 16. During this unscrewing operation, rotation of the focusing ring 15 back from the normal near point stop (i. e. the end of the peripheral slot in the stationary ring 14) is prevented by the engagement between the stud 18 and the edges of the spiral slot 20. On the other hand, when the stud 18 is in the longitudinal portion 19 of the slot, no rotational movement of the focusing sleeve 17 relative to the stationary ring 14 is permitted. Thus the arrangement of the pin and slot coupling 18, 19, and 20 prevents simultaneous operation of the two focusing mechanisms one of which consists of the normal driving sleeve 16 operating on the focusing sleeve 17 and the other of which consists of unscrewing the focusing sleeve 17 from the driving sleeve 16.

As best shown in Figs. 1 and 3, the diaphragm setting ring 25 is adjusted in accordance with the position of an index 27 on a diaphragm scale 28.

Throughout the normal focusing range, the focusing ring 15 is rotated relative to the lens and hence to the cover ring 22 which is carried axially with the lens. A normal focus scale 30 is provided in the usual way on the focusing ring 15 to read against an index 29 carried by this moving cover ring 22. In the arrangement shown, the near point of the normal focusing range is taken as four feet. When the focusing ring 15 has been rotated to this near point, the scale marking 4 on the normal focus scale 30 comes opposite the normal focus index 29. At the same time, there appears from under the focusing ring 15 a close-up focus scale 32 marked on the cover ring 22. A close-up focus index 31 carried by the focusing ring 15 now comes opposite the marking 4 on this close-up focus scale 32. As pointed out above, the stud 18 in the stationary ring 14 comes to the end of the longitudinal slot 19 and into a position to enter the spiral slot 20 as this near point of the normal focusing range is reached. Also the focusing ring 15 and the driving sleeve 16 becomes rigid and the focusing sleeve 17 may now be unscrewed therefrom. During this unscrewing motion, successive markings on the close-up focus scale 32 appear from under the focusing ring 15 and come opposite the index 31 to indicate the distance for which the lens is focused in this close-up range. If desired, the portion of the cover ring 22 which appears from under the focusing ring 15 when operating in the close-up range, may be slightly roughened or otherwise provided with a grip for gripping the lens to unscrew it.

In Fig. 2, the spiral slot 20 is shown short for convenience in illustrating. In practice this slot extends about once or even farther around the focusing sleeve 17 and usually crosses the screw threads 23.

Having thus described the preferred embodiment of my invention, I wish to point out that it is not limited to the specific structure shown but is of the scope of the appended claims.

What I claim and desire to secure by Letters Patent of the United States is:

1. A lens system comprising in combination, a lens, a mount for the lens, means engaging the mount for focusing the lens over a range from infinity to a normal near point, separate means engaging the mount and operative for focusing the lens only over a close-up range having said normal near point as its far point and means operatively connected between the two focusing means for preventing the simultaneous operation thereof.

2. A lens system comprising in combination, a lens, a mount for the lens, means engaging the mount for focusing a lens over a range from infinity to a normal near point, separate means engaging the mount and operative for focusing the lens only over a close-up range having said normal near point as its far point and means operatively connected between the two focusing means for holding each of the focusing means against operation during the operation of the other focusing means whereby simultaneous operation of both focusing means is prevented.

3. A lens system comprising a lens, a barrel for the lens having screw threads coaxial with the lens, a rotatable sleeve with screw threads engaging the threads of the barrel for focusing the lens, a stationary support for the barrel and the sleeve, a stop on the support limiting the rotation of the sleeve in the direction which focuses the lens on nearer objects, a pin and slot coupling between the support and the barrel permitting axial movement and preventing rotation of the barrel from a normal orientation with respect to the support when the sleeve is not against said limiting stop and permitting rotation of the barrel in the screw threads of the sleeve and relative to the support when the sleeve is against said limiting stop and means for preventing rotation of the sleeve when the barrel is rotated from said normal orientation.

4. A lens system according to claim 3 in which the means for preventing rotation of the sleeve is part of said pin and slot coupling.

5. A lens system comprising a lens, a barrel for the lens, means for moving the barrel axially for focusing the lens over a range from infinity to a normal near point, means for moving the barrel spirally for focusing the lens over a close-up range having said normal near point as its far point, means for preventing rotation of the barrel during the operation of said axially moving means and means for preventing operation of said axially moving means during operation of the spirally moving means.

6. A lens system according to claim 5, in which the means for preventing operation of said axially moving means during operation of the spirally moving means consist of means for preventing other than conforming spiral movement of the barrel at that time.

JOSEPH MIHALYI.